US012605741B2

(12) United States Patent
Júnior

(10) Patent No.: US 12,605,741 B2
(45) Date of Patent: Apr. 21, 2026

(54) ENHANCED MODULAR MESHES AS PART OF A VIBRATING SCREEN COMPONENT THAT INTEGRATES CUBIC AND LAMELLAR SORTING EQUIPMENT FOR SORTING MINING MATERIALS, A SYSTEM FOR JOINT FASTENING OF ADJOINING UNITS OF ENHANCED MODULAR MESHES TO THE STRUCTURAL BASE OF A VIBRATING SCREEN COMPONENT, AND A PROCEDURE FOR ASSEMBLING/DISMANTLING THAT BASE

(71) Applicant: HAVER & BOECKER LATINOAMERICANA LIMITADA, Pedro Leopoldo (BR)

(72) Inventor: Célio Geraldo Esquarcio Júnior, Caeté (BR)

(73) Assignee: HAVER & BOECKER LATINOAMERICANA LIMITADA, Pedro Leopoldo (BR)

( * ) Notice: Subject to any disclaimer, the term of this patent is extended or adjusted under 35 U.S.C. 154(b) by 0 days.

(21) Appl. No.: 18/860,459

(22) PCT Filed: Jan. 24, 2023

(86) PCT No.: PCT/BR2023/050027
§ 371 (c)(1),
(2) Date: Oct. 25, 2024

(87) PCT Pub. No.: WO2024/059918
PCT Pub. Date: Mar. 28, 2024

(65) Prior Publication Data

US 2025/0312824 A1 Oct. 9, 2025

(30) Foreign Application Priority Data

Sep. 19, 2022 (BR) .......................... 1020220187495

(51) Int. Cl.
*B07B 1/46* (2006.01)
*B07B 1/28* (2006.01)

(52) U.S. Cl.
CPC .............. *B07B 1/4645* (2013.01); *B07B 1/28* (2013.01); *B07B 2201/02* (2013.01)

(58) Field of Classification Search
CPC . B07B 1/4645; B07B 2201/02; B01D 25/001; B01D 25/02; B01D 29/012;
(Continued)

(56) References Cited

U.S. PATENT DOCUMENTS 4,141,821 A 2/1979 Wolff
4,409,099 A 10/1983 Wolff
(Continued)

FOREIGN PATENT DOCUMENTS

BR 8605885 A 8/1987
BR 112019005223 A2 6/2019

OTHER PUBLICATIONS

International Search Report and Written Opinion issued in PCT/BR2023/050027 mailed Jun. 19, 2023, 7 pages.
(Continued)

*Primary Examiner* — Michael Mccullough
*Assistant Examiner* — Kalyanavenkateshware Kumar
(74) *Attorney, Agent, or Firm* — MUNCY, GEISSLER, OLDS & LOWE, P.C.

(57) ABSTRACT

"Enhanced modular meshes as part of a vibrating screen component that integrates cubic and lamellar sorting equipment for sorting mining materials, a system for joint fastening of adjoining units of enhanced modular meshes to the structural base of a vibrating screen component, and a procedure for assembling/dismantling that base" represented by an inventive solution that is beneficial to the mining industry and notably useful when applied to the procedure of
(Continued)

cubic and lamellar sorting of ore extracted from ore deposits, capable of solving a widely found problem of too long maintenance downtimes for replacing a part or even all of the matrix of modular meshes that integrates the cubic and lamellar sorting screen component, for which an enhanced fastening means (Fxa) has been designed that involves introducing, along with the domes (20*c*) provided in the body (20*a*) of the enhanced modular mesh (20), an extension in the form of semicircular expansion flaps (20*d*), causing, with the alignment of two of these meshes (20) and (20'), a consequential alignment of their semicircular expansion flaps (20*d*) and (20*d'*) to a fastening rod (Bu) ready to receive the fastening pin (40).

8 Claims, 20 Drawing Sheets

(58) Field of Classification Search
CPC ......... B01D 29/52; B25B 13/48; B25B 13/50; F16B 23/0061; F16B 33/006; F16B 37/125; F16B 5/02; F16B 5/0241
See application file for complete search history.

(56) References Cited

U.S. PATENT DOCUMENTS 5,213,217 A * 5/1993 Galton .................. B07B 1/4645 209/408
6,267,246 B1 * 7/2001 Russell ................... B07B 1/469 209/408
2021/0008594 A1 * 1/2021 Johnson ................... C08J 5/043

OTHER PUBLICATIONS

Written Opinion of the International Preliminary Examining Authority mailed Feb. 24, 2024, 4 pages.

* cited by examiner

ENHANCED MODULAR MESHES AS PART OF A VIBRATING SCREEN COMPONENT THAT INTEGRATES CUBIC AND LAMELLAR SORTING EQUIPMENT FOR SORTING MINING MATERIALS, A SYSTEM FOR JOINT FASTENING OF ADJOINING UNITS OF ENHANCED MODULAR MESHES TO THE STRUCTURAL BASE OF A VIBRATING SCREEN COMPONENT, AND A PROCEDURE FOR ASSEMBLING/DISMANTLING THAT BASE

TERMS

For the purpose of providing a better understanding of the material disclosed and claimed under this invention patent, the meaning of some terms and acronyms largely mentioned in the descriptive report is presented, where:

Vibrating screening equipment: specifically for use in the ore processing industry, such as coal, iron ore, and others, aiming at sorting them by size, used in a stage following the crushing stage, for example.

Sorting screen component: it aims to allow for the screening of raw materials coming from ore processing, a sorting process that is conducted according to cubic and lamellar (non-exhaustive) specifications, comprising a plurality of modular meshes mounted in a manner adjacent to and jointly with each other along a chassis-type base.

Modular meshes: a mesh unit that is mounted to a base in a joint association with a plurality of equal modular meshes that constitute the screen component itself of vibrating screener-type equipment, with a design concept based on a monolithic piece, the planar base of which has a matrix of openings provided, which can for example provide any given geometric profile, for instance, a "conic" profile, a "U" profile, and others, and mounted over a base structure, such as a structural chassis.

Maintenance: for the purpose of this patent, it is defined as the act of maintaining, sustaining, repairing, or further preserving equipment, mainly that which is used in mining activities. Maintenance consists of a set of actions that assist in the proper and correct functioning of equipment.

Along this line of thought, maintenance is defined in the following types: corrective, preventive, predictive, detective, and, for the purpose of this patent, the maintenance system is aimed at giving excellence to predictive maintenance.

Predictive Maintenance: it is an action carried out based on a change in the "condition" or "performance" parameter, with monitoring that occurs systemically. This type of maintenance aims to prevent equipment or system failure by monitoring several parameters, enabling the equipment to continuously operate for the longest time possible.

Corrective maintenance: defined as any maintenance conducted for the purpose of restoring the optimal, initial functioning conditions of machines and equipment, by eliminating any sources of failure that may exist. This is an action in response to the failure itself, in which the downtime of the faulty equipment was not planned, negatively impacting on the machine-hour rate of a constant-flow activity such as mining.

Machine Hour Rate: the quantity of hours worked by a machine.

RPM: Rotations Per Minute.

Ergonomics: it aims to comfortably and productively develop the connection between the human being (in this case, a worker) and the work (maintenance of the cubic and lamellar sorting screen component). By adapting the working conditions to the worker's characteristics, ergonomic risks are avoided and increased health, comfort, safety, and well-being are assured.

Person skilled in the art: according to the understanding of treaty writers CHAVANNE, Albert & BURST, Jean-Jacques, in their work Droit de Lá Propriété Industrielle to: Dalloz, 1993, p. 5355, in a remissive manner, it is an expert in the field who has the regular and average knowledge of the technique that will be the subject of an analysis, which for the purposes of this utility model is a technician who knows technical specifications of the equipment used in mining processes.

IPC: International patent classification.

The list of terms, technologies, and technical concepts presented in this preliminary topic must be considered for the proper understanding of this utility model, giving the necessary descriptive sufficiency to the body of the descriptive report, and it must be used as a reference for studies in comparative analyses whether with hypothetical, prior-art solutions that anticipate the utility models and for vibrating mechanisms of the same nature already disclosed or sold by third parties other than the holders of this patent, on a date either preceding or after the date of filing hereof.

BRIEF DESCRIPTION OF THE FIGURES

As a supplement to this description in order to obtain a better understanding of the prior art, the problem to be solved, and the distinguishing characteristics of this invention, this description is accompanied by an attached set of drawings, where.

FIELD OF APPLICATION

Figure 1:
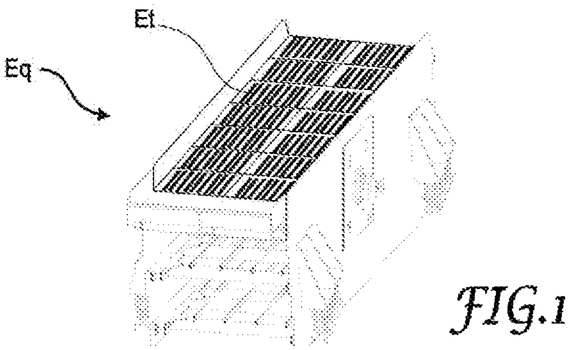
FIG. 1 is an illustrative representation from a perspective view of vibrating screening equipment, evidencing the cubic and lamellar sorting screen component.
Figure 2:
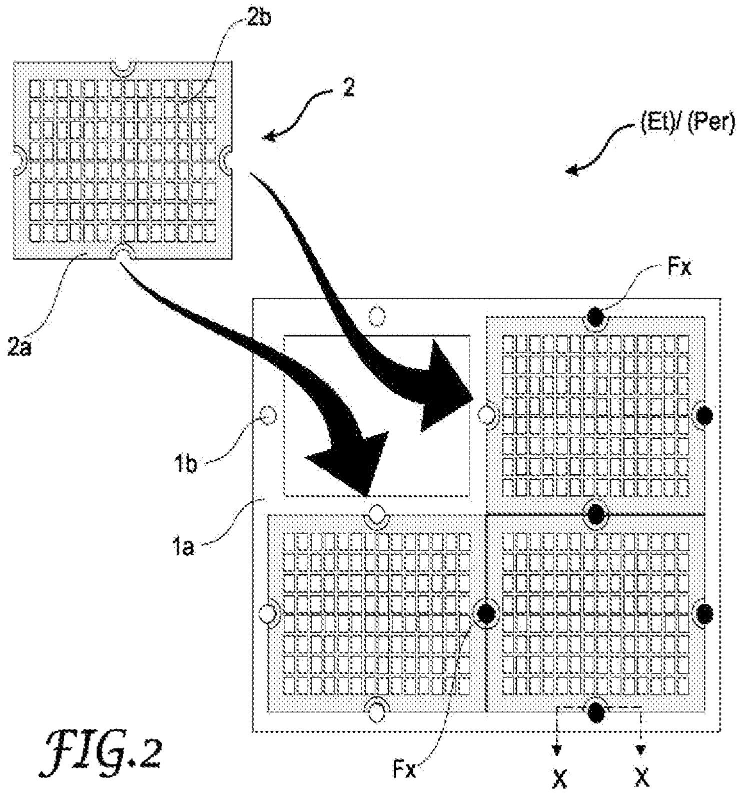
FIG. 2 is an illustrative representation in an elevation view of the conventional cubic and lamellar sorting screen component, evidencing its basic design concept.

This invention patent has as its field of application the industry and trade of vibrating equipment with a mechanical vibration technology, notably focused on the activities of the ore processing industry, with a particular application to mining screening equipment, such as the equipment (Eq) in FIG. 1, which finds a particular application along with the cubic and lamellar sorting screen component (Et), as seen in FIGS. 1 and 2, which integrates this type of equipment (Eq).

It should be added that, in spite of the fact that the inventions defined in this invention patent have had mining activities as a paradigm for research and development, the type of material that is sent to the vibrating screening equipment to which they apply is not limited to ores and actually extends to all sorts of bulk materials, either virgin or processed, such as chemicals (e.g. fertilizers, agrochemicals, and others).

Demand for the Invention Patent a. Introduction

The applicant has designed this invention patent grounded in technical expertise accrued over years of practice developing equipment for mining plants, which has turned into a privileged view of the advantages and limitations that it has identified.

b. Demand for the Invention

Figure 3:
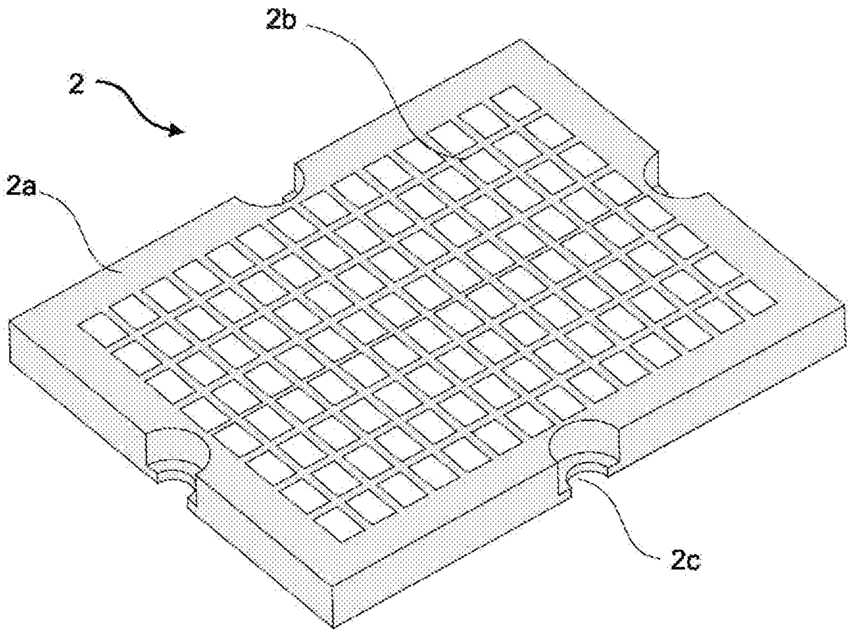
FIG. 3 is an illustrative representation of a conventional modular mesh that integrates the conventional cubic and lamellar sorting screen component, used in this paper as a paradigm for identifying the problem to be solved by the invention patent, evidencing its design concept.

In view of the need for maintenance of the vibrating screening component (Et) of mining screening equipment (Eq), seen in FIGS. 1 And 2, more specifically the as dismantling/assembly of a plurality of modular mesh elements (2), as seen in FIGS. 2 and 3, the applicant has identified in its maintenance activity (whether predictive or corrective) a list of needs:

b.1 From an Industrial Standpoint

Making it possible to carry out the maintenance activity, which translates as the replacement of modular mesh units, in the shortest possible time, mitigating the effects of a productivity loss in the mining field upon the downtime of the primary equipment, the vibrating screen (Eq), as one cannot fail to acknowledge, in particular, that the mineral extraction activity is a continuous activity, with an interruption in any sector of the mineral extraction flow leading to damage to all other sectors, as this is a serial flow.

In view of the fact that the maintenance (especially the predictive type) of the screen component implies a removal of all modular meshes for cleaning and/or replacement, it is a certain fact that the maintenance time for conventional screens negatively impacts on the downtime.

b.2 From a Technical/Equipment Standpoint

In view of the fact that the cubic and lamellar sorting screen component (Et) comprises the assembly of a plurality of modular meshes (2), mounted jointly with each other along a chassis-type base (1), see FIG. 2, the applicant does not fail to consider that, for that component, its modular meshes (2) are in general prepared from a polymeric material, more specifically an elastomer, or a composition thereof, which gives it the characteristic of a rubber part, as required for its specific application to vibrating screens used in mining, since that component is subject to the effects of vibration generated by an excitation piece of equipment that works at very high rotations per minute (RPM).

Bearing this in mind, taking into account the "intense, nonstop vibration" factor, this invention patent assumes that the fastening system for these modular meshes (2) attains efficacy from the gradually increasing stability of the assembly for the plurality of these modular meshes, even though impacted by the vibrational waves.

b.3 From the Standpoint of the Modular Mesh Assembly/Dismantling Procedure

Figure 10A:
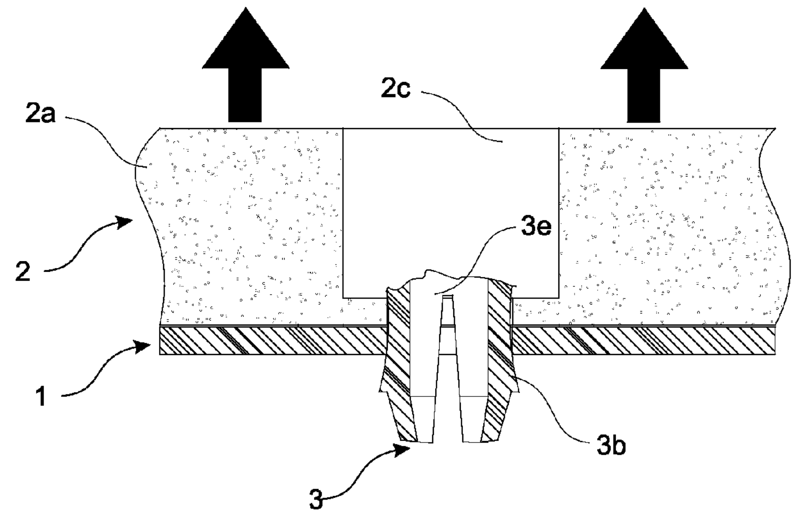
FIGS. 10*a* and 10*b* are illustrative representations in an orthogonal view "XX" of FIG. 2, evidencing the third step of removal of the modular meshes that integrate the conventional cubic and lamellar sorting screen component, with a complete removal of the modular rods relatively to the chassis base, which in its turn keeps a lower part of the bushing inserted in it.
Figure 10B:
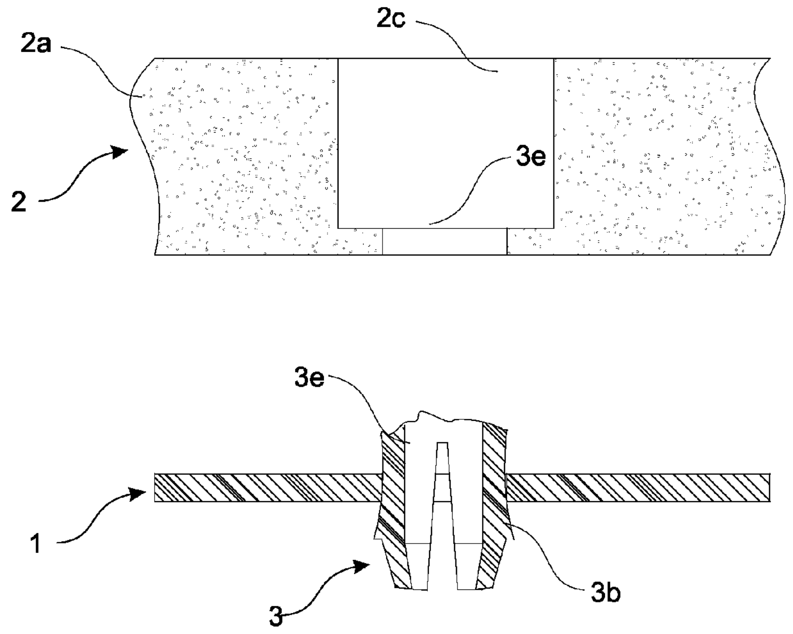

Providing the worker who performs the maintenance of the cubic and lamellar sorting screen component (Et) with an easy/quick procedure for performing it, as the scope of the maintenance to be conducted can apply to the replacement of a single modular mesh component (2), as seen in FIGS. 2 and 3, in the case of corrective maintenance, for instance, as well as imply the removal and replacement of all of such modular meshes (2), in the case of predictive maintenance, as seen in FIG. 10.

b.4 From an Occupational Safety Standpoint

Providing the worker who performs the maintenance with an ergonomic procedure for removal and replacement of modular meshes (2), mitigating their physical stress and helping prevent workplace incidents/accidents.

Mitigating the worker's absence from their on-site work roles along with the screening equipment.

b.5. From the Standpoint of the Industry/Company

Minimizing the total industrial cost;

Maximizing the productivity of the sorting operation for the mineral extracted from ore deposits; and Minimizing indemnification lawsuits for workplace accidents filed by labor unions.

Coverage of the Invention Patent a. Idealized Inventions

In accordance with the demand for the invention patent, the following inventions have been idealized in the same patent application, namely:

a.1 First invention: an enhancement has been designed for the body of the modular mesh that is part of a vibrating screen that integrated the cubic and lamellar sorting equipment for materials coming from mining (and related) activities, wherein the distinctive feature lies in its design concept whereby its body incorporates at least one ancillary bushing section for the pin-based fastening (conventional);

a.2 Second invention: an all-new joint fastening system has been designed for the enhanced adjoining modular mesh units (from the first invention) fastened to the structural base of a cubic and lamellar sorting vibrating screen component, wherein the distinctive feature lies in the fact that bushing-type elements are formed when the joining between two ancillary fastening bushing sectors gets in the joining of two enhanced modular meshes; and a.3 Third invention: an all-new procedure has been designed for joint fastening of enhanced adjoining modular mesh units (from the first invention) fastened to the structural base of a vibrating screening component.

As will be demonstrated along this paper, all three inventions meet the principle of unity of invention, since not only are they interconnected, but they also share the same inventive concept.

b. Patentability Requisites

The inventions herein defined meet the requisites of novelty, inventive step, and industrial application, since, as will be demonstrated, they do not obviously or evidently result from other technologies applicable to modular meshes and their fastening systems to the chassis base of the cubic and lamellar sorting screen component provided in the state of the art and give advantages from a technical, industrial, and commercial standpoint, as will be demonstrated in a subsequent topic of this paper.

Lastly, it can be asserted that a technician from the field, or a person skilled in the art, upon facing the material disclosed for the technologies provided in the state of the art, is unable, through the lessons from the latter, reach the solutions revealed and claimed in the interconnected inventions of this invention patent.

Fundamentals of the Technique

In order to provide veracity and consolidate the context explained in the introductory section, an explanation will be provided on the state of the art for technology in the form of a cubic and lamellar sorting screen component (Et), screening equipment (Eq), as seen respectively in FIGS. 1 and 2, after a critical analysis of which, once it is evaluated by persons skilled in the art, it will be possible to identify its limiting aspects, thus consolidating the identification of the previously mentioned demand list of demands.

a. State of the Art a.1 Common State of the Art

The applicant has proven expertise in developing screening equipment (Eq) and may assert that there are countless known constructive configuration specifically for the cubic and lamellar sorting screen component (Et).

For acculturation purposes only, in order to better situate the field of application of the invention patent, the Brazilian patent document under number D1 MU 7701590-8 is worth mentioning, titled "Layout introduced in means for fastening modular components of screens for the mining industry", the design concept of which is illustrated in FIG. 2, which reveals that the screen component (Et) is comprised of a plurality of modular meshes, called in this text conventional modular meshes (2), installed to the chassis (2) of the vibrating screen (Et).

In its turn, that screen (2) has, at its planar base (2*a*), a matrix of hollow elements (2*b*) with all sorts of geometric shapes, for instance, "conical", U profiles, and others.

In their turn, on the sides of these meshes (2), domes (2*c*) are provided, as seen in FIG. 3, which align to fastening holes (1*b*) provided in the body (1*a*) of the chassis base (1), as seen in FIG. 2.

a.2 Close Prior Art

It is that which meets the goals of the invention patent now claimed, but which, following a critical analysis, has its negative (or deficit) aspects revealed and becomes a part of the problem to be solved, thus incorporating the goals of the patent.

So, the applicant has defined, as the close prior art for this invention patent, that which meets the assumptions of technical efficacy, reliability, and durability of the cubic and lamellar sorting screen component (Et), which bears a direct relationship with the fastening system of two conventional modular meshes (2).

Figure 4A:
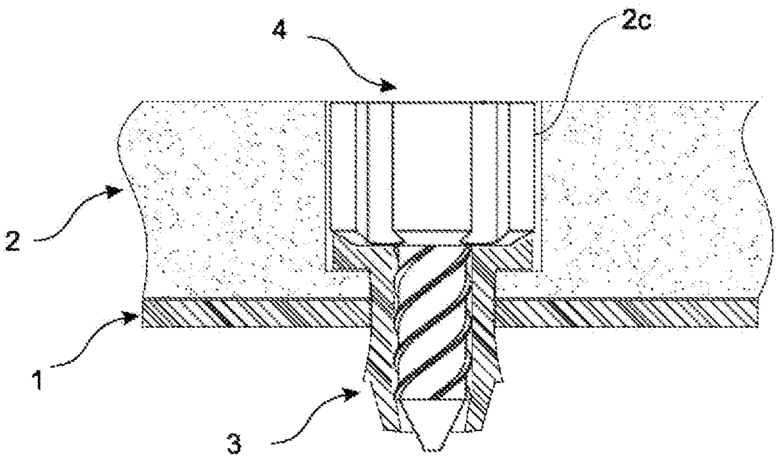
FIG. 4*a* is an illustrative representation in an orthogonal view "XX" of FIG. 2, evidencing the conventional fastening system used in the joint mount between two modular meshes that integrate the conventional cubic and lamellar sorting screen component.
Figure 4B:
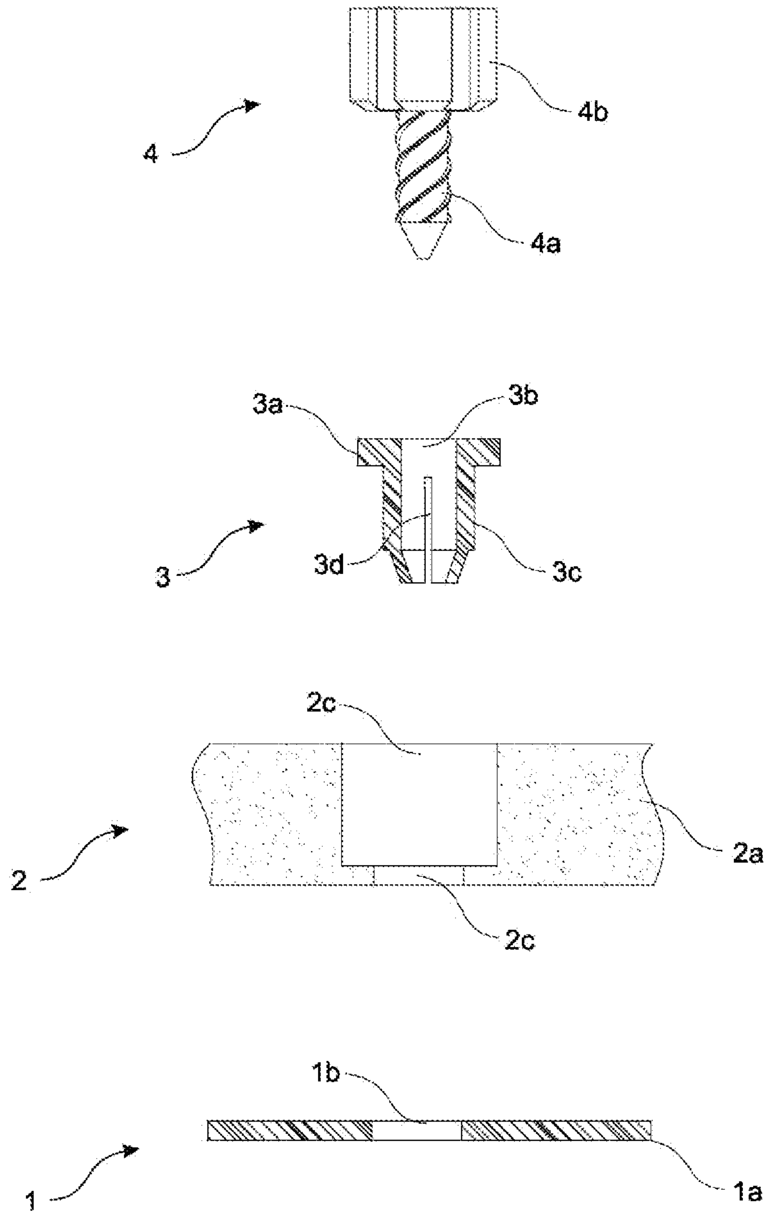
FIG. 4*b* is an illustrative representation in an exploded view of FIG. 4*a*, evidencing the parts of the conventional fastening system used in the joint mount between two modular meshes that integrate the conventional cubic and lamellar sorting screen component.

Searches conducted in patent databases and even in abounding literature of the field of mining have pointed out several solutions that fall under that definition of close prior art, and the identified patent documents especially include the Brazilian patent document under numbered BR 112019005223-2 A2, titled "WEAR PROTECTION LINER ARRANGEMENT AND METHOD FOR ATTACHING LINER ELEMENTS TO A SUPPORT STRUCTURE", which has been chosen as a paradigm for studies and critical analyses to be described in the next paragraphs.

a.2.1 Design concept: based on the elements learned from a careful read of document D2 BR 112019005223-2 A2, in which, such as revealed in FIGS. 2, 3, 4*a*, and 4*b*, the conventional cubic and lamellar sorting screen component is comprised of:

- a chassis base (1) made of a metallic material, comprising a body (1*a*) in the form of a frame and crossbars, on the surface of which fastening openings are provided (1*b*) with the role of receiving the locking element of the fastening system of two conventional modular meshes (2);
- a plurality of conventional modular meshes (2), each of which made of a polymeric material, notably an elastomer, which provides it with some degree of flexibility, comprising a body (2*a*), preferably of rectangular shape, the planar base of which is provided with a matrix of hollow elements (2*b*), in which, at the median portion of the sides of the same body (2*a*), domes are provided (2*c*), as shown in FIG. 3, with the role of receiving a half part of the conventional means of fastening of that conventional modular mesh (2) to the chassis base (1);
- a fastening means (Fx) that is assembled and fastened to the housing formed by the adjoining positioning of two domes (2*c*) of two corresponding conventional modular meshes (2), as seen in FIG. 2, and comprised of three elements:
- (i) fastening bushing (3), as seen in FIGS. 4*a* and 4*b*, made of a polymeric material, comprising a base (3*a*) with a nominal diameter approximately equal to the diameter formed by the joining of two domes (2*c*), underneath such base (3*a*) two semi-circular expansion flabs (3*b*) being provided, which in turn have transverse gaps (3*c*);
- (ii) a lock pin (4) made up of a threaded body (4*a*) limited at the top by a special head (4*b*), the latter comprising a structured profile that makes it mandatory to use a special screwing tool, which sensibly limits the screwing/unscrewing operation for this conventional system.
- (iii) a special screwing tool (not shown) with a fitting profile that is supplementary to the special profile of the head (4*a*) of the lock pin (4).

a.2.2 Fastening Procedure for two Modular Meshes

Figure 5A:
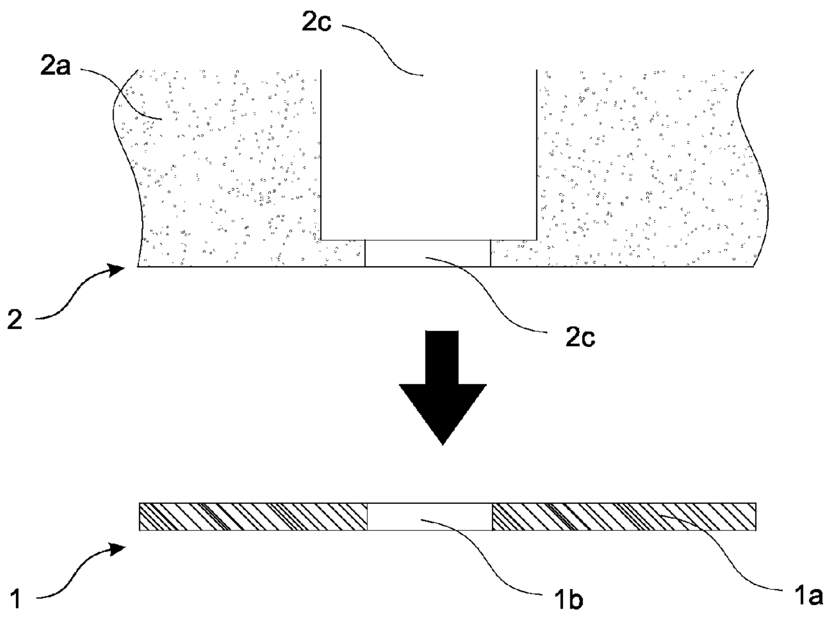
FIGS. 5*a* and 5*b* are illustrative representations in an orthogonal view "XX" of FIG. 2, evidencing the first step of application of the conventional fastening system used in the joint mount between two modular meshes that integrate the conventional cubic and lamellar sorting screen component.
Figure 5B:
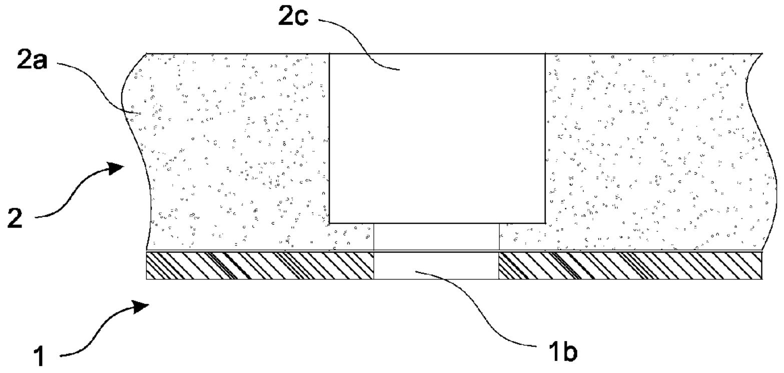
Figure 6A:
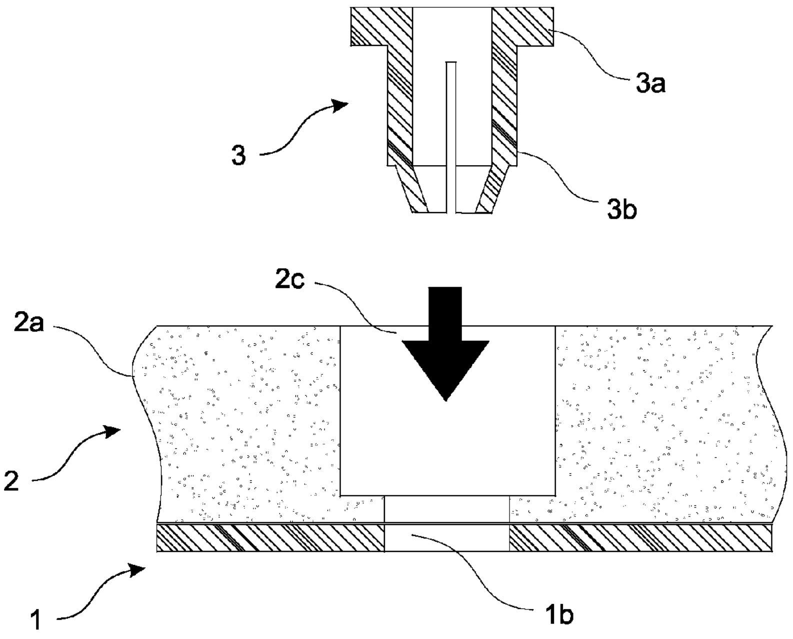
FIGS. 6*a* and 6*b* are illustrative representations in an orthogonal view "XX" of FIG. 2, evidencing the second step of application of the conventional fastening system used in the joint mount between two modular meshes that integrate the conventional cubic and lamellar sorting screen component.
Figure 6B:
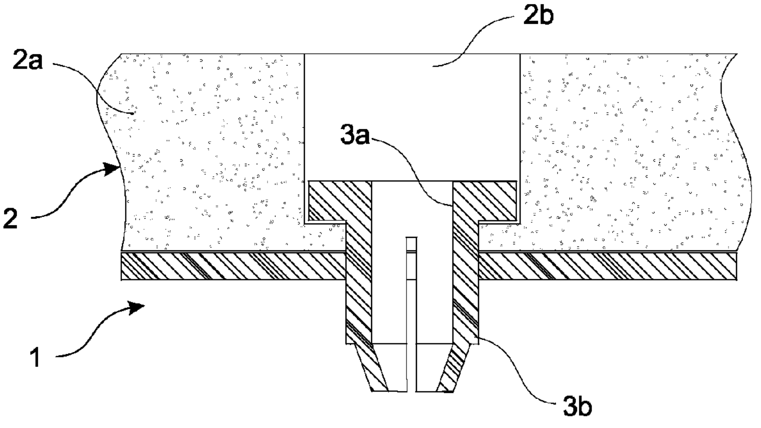
Figure 7A:
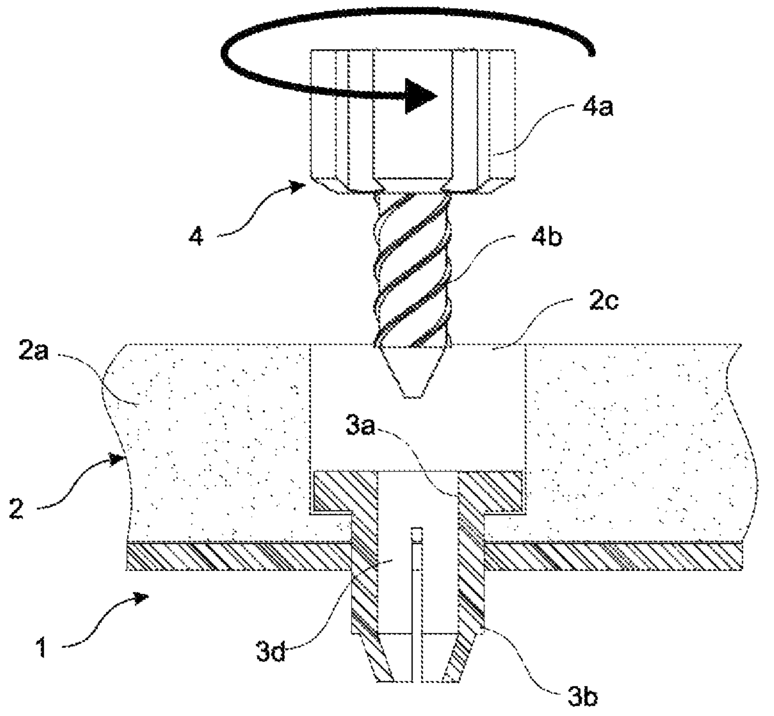
FIGS. 7*a* and 7*b* are illustrative representations in an orthogonal view "XX" of FIG. 2, evidencing the third step of application of the conventional fastening system used in the joint mount between two modular meshes that integrate the conventional cubic and lamellar sorting screen component.
Figure 7B:
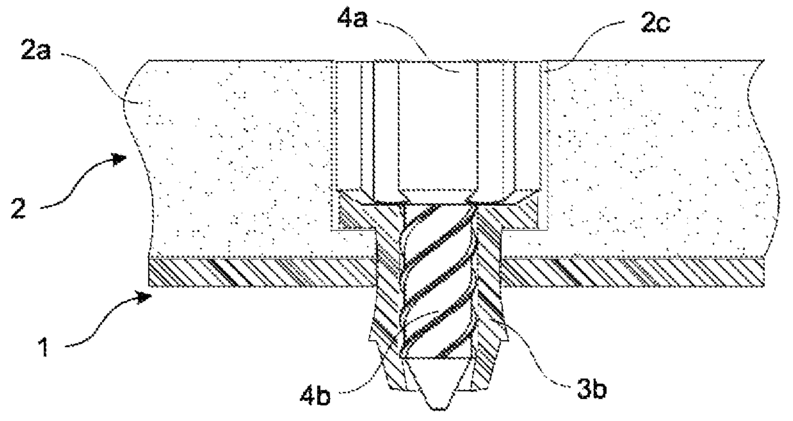

This procedure is conducted using the conventional fastening means (Fx), and the following steps are defined:

- Step 1, as seen in FIGS. 5*a* and 5*b*, whereby the worker, holding two conventional modular meshes (2), positions them over the chassis base (1), so that two adjoining domes (2*c*) will have their circular opening positioned right above a corresponding fastening opening (1*b*);
- Step 2, as seen in FIGS. 6*a* and 6*b*, whereby the worker, holding a bushing part (3), directs it to assemble it in the set comprised of two domes (2*c*) and a fastening opening (1*b*), with the semicircular expansion flaps (3*b*) passing through the fastening opening (1*b*) of the chassis base (1), up to the limit in which the lower part of its base (3*a*) rests at the bottom of the domes (2*c*); and
- Step 3, as seen in FIGS. 7*a* and 7*b*, whereby the worker, holding the pin part (4), by using the special screwing tool (not shown), proceeds to position it over the center canal (3*d*) of the bushing (3), with the pin (4) doing a descending rotational displacement motion, as seen in FIG. 7*a*, in which, as the threaded body (4*b*) penetrates the center canal (3*d*), the semicircular expansion flaps expand (3*b*), as seen in FIG. 7*b*, which creates an interference consistent with the fastening opening (1*b*), thus generating the desired locking of the conventional modular meshes (2) onto the chassis base (1), as seen in FIG. 2;

a.2.3 Conventional Screen Maintenance Procedure

On a preliminary basis, this procedure is conducted at the end of the service life cycle of conventional modular meshes (2), when there is a degradation of the plasticity characteristics of the bushing component (3), which starts to have a rigid and even brittle structure.

Figure 8A:
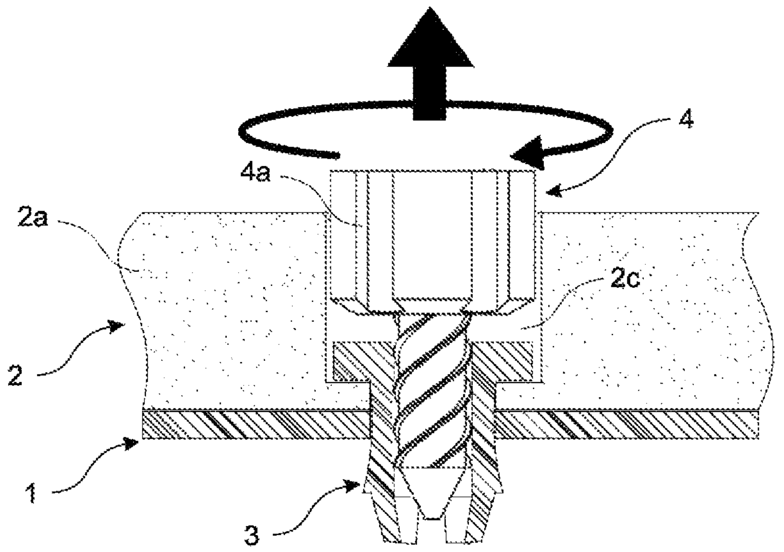
FIGS. 8*a* and 8*b* are illustrative representations in an orthogonal view "XX" of FIG. 2, evidencing the first step of removal of the modular meshes that integrate the conventional cubic and lamellar sorting screen component, with a progressive removal of the parts of the conventional fastening system, upon a predictive or corrective maintenance action.
Figure 8B:
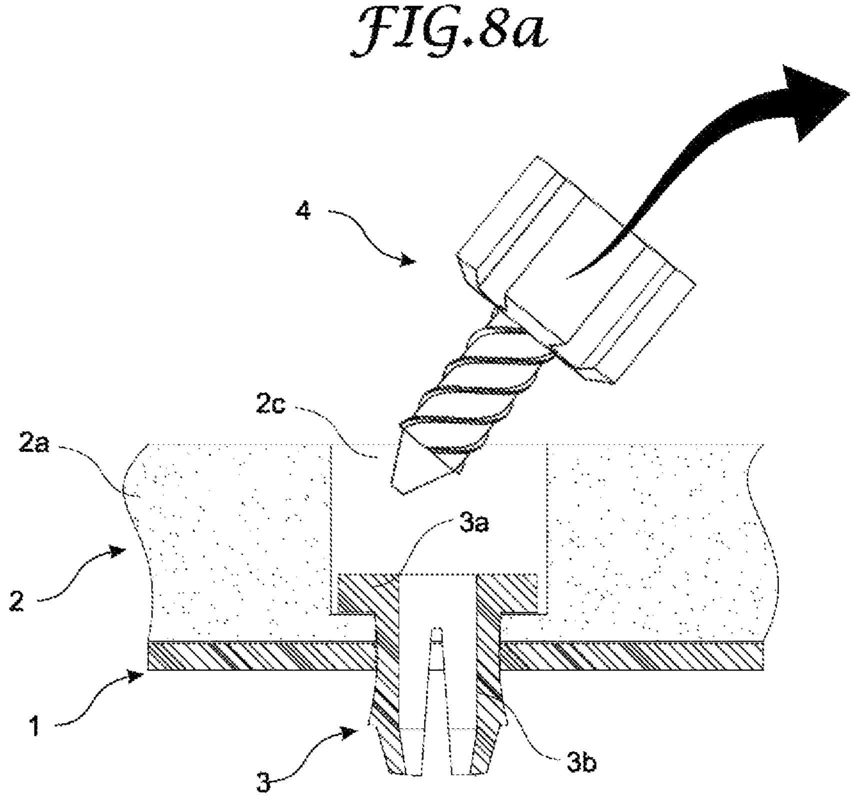
Figure 9A:
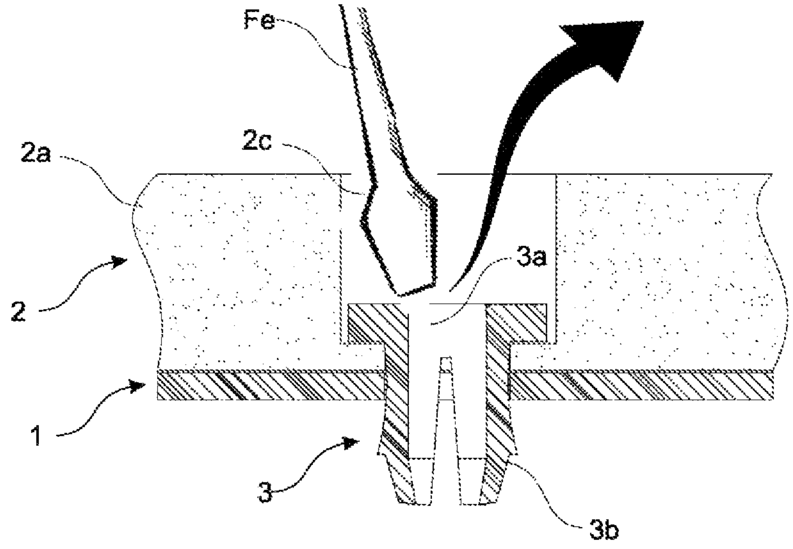
FIGS. 9*a* and 9*b* are illustrative representations in an orthogonal view "XX" of FIG. 2, evidencing the second step of removal of the modular meshes that integrate the conventional cubic and lamellar sorting screen component, with a partial removal of the bushing part that integrates the components of the conventional fastening system, demonstrating the poor ergonomics and maintenance of a portion of that bushing at the chassis base of the screen component.
Figure 9B:
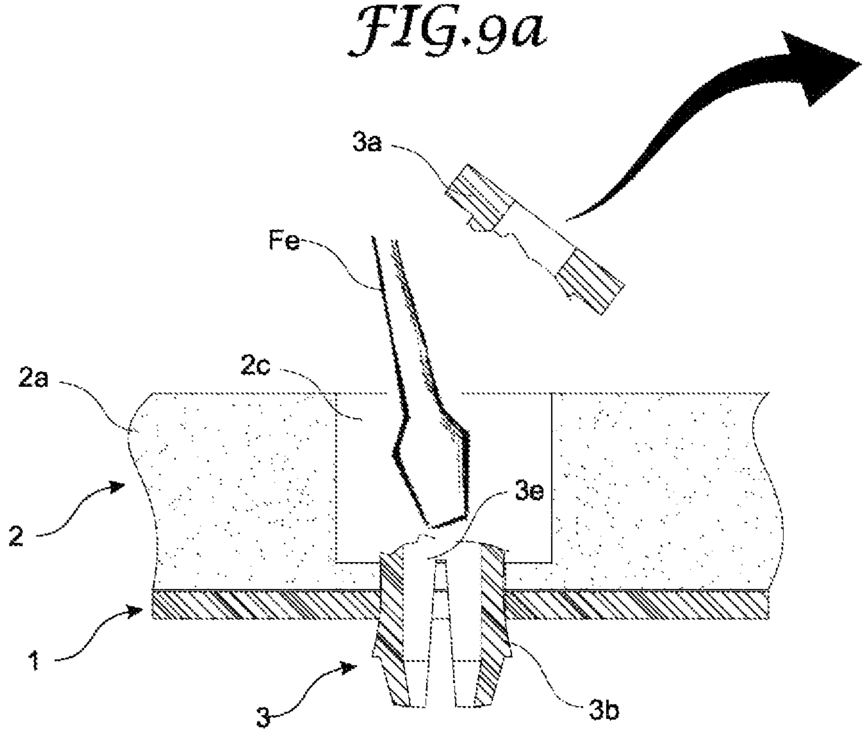

This procedure is conducted by removing the conventional fastening means (Fx), and the following steps are defined:

- Step 1, as seen FIGS. 8*a* and 8*b*, whereby the worker, holding the special screwing tool (not shown), proceeds to position it and fit it over the special head (4*a*), unscrewing the pin (4) until it is completely detached. In that condition, the bushing (3) is found virtually welded to the fastening opening (1*b*), as the long time and extreme environmental conditions to which it is subject makes it lose its plastic characteristics.
- Step 2, as seen in FIGS. 9*a* and 9*b*, whereby the worker needs to use a tool (Fe) such as a screwdriver or a trowel to remove the bushing (3), with such procedure being difficult and leading to the base (3*a*) being broken, but with a protrusion (3*e*) remaining in the fastening opening (1*b*) of the chassis base (1); and
- Step 3, as seen in FIGS. 9*a* and 9*b*, whereby the worker separates the modular meshes (2) of the chassis base (1), with a protrusion (3*e*) being maintained in the fastening opening (1*b*) of the chassis base (1).

b. Critical Analysis of the Close Prior Art Solution b.1 From the Standpoint of the System for Fastening the Modular Meshes to the Structural Base of the Screen

- it is a very complex systems that is comprised of three component parts, with the pin being a special part requiring the use of a screwdriver tool with a special coupling profile;

b.2 From the Standpoint of the Modular Mesh Assembly Procedure

- it is necessary to align the dome (3c) of the conventional modular mesh (2) to the fastening opening (1b) of the chassis base (1) without any support or guide point;
- it is necessary to apply the bushing (3) in the fastening opening (1b) of the chassis base (1), with this operation being carried out by applying an impact force over the bushing (3) until its higher-diameter body wins and surpasses the opening (1b) of the chassis base (1), which is only attained after countless "blows", causing the worker to get tired and lose time consolidating the subset of bushing (3)+dome (2c)+fastening opening (1b); and
- it is necessary to apply the pin (4) along with the bushing (3) by screwing it with a special screwdriver tool with a dedicated key that adapts to the axial slots in the head (4a) of the pin (4)

b.3 From the Standpoint of the Modular Mesh Dismantling Procedure

- the removal of the pin (4) along with the bushing (3) is done by unscrewing it with a special screwdriver tool with a key that adapts to the axial slots in the head (4a) of the pin (4).
- the bushing (3) is made of a polymeric material that, as along the service life of the conventional modular mesh (2) it is tensioned by the pin (4), it loses its "elastic memory" property and becomes more rigid, with the semicircular expansion flaps (3b) already stretched become an obstacle to its removal from the fastening opening (1b) of the chassis base (3).

Figure 11:
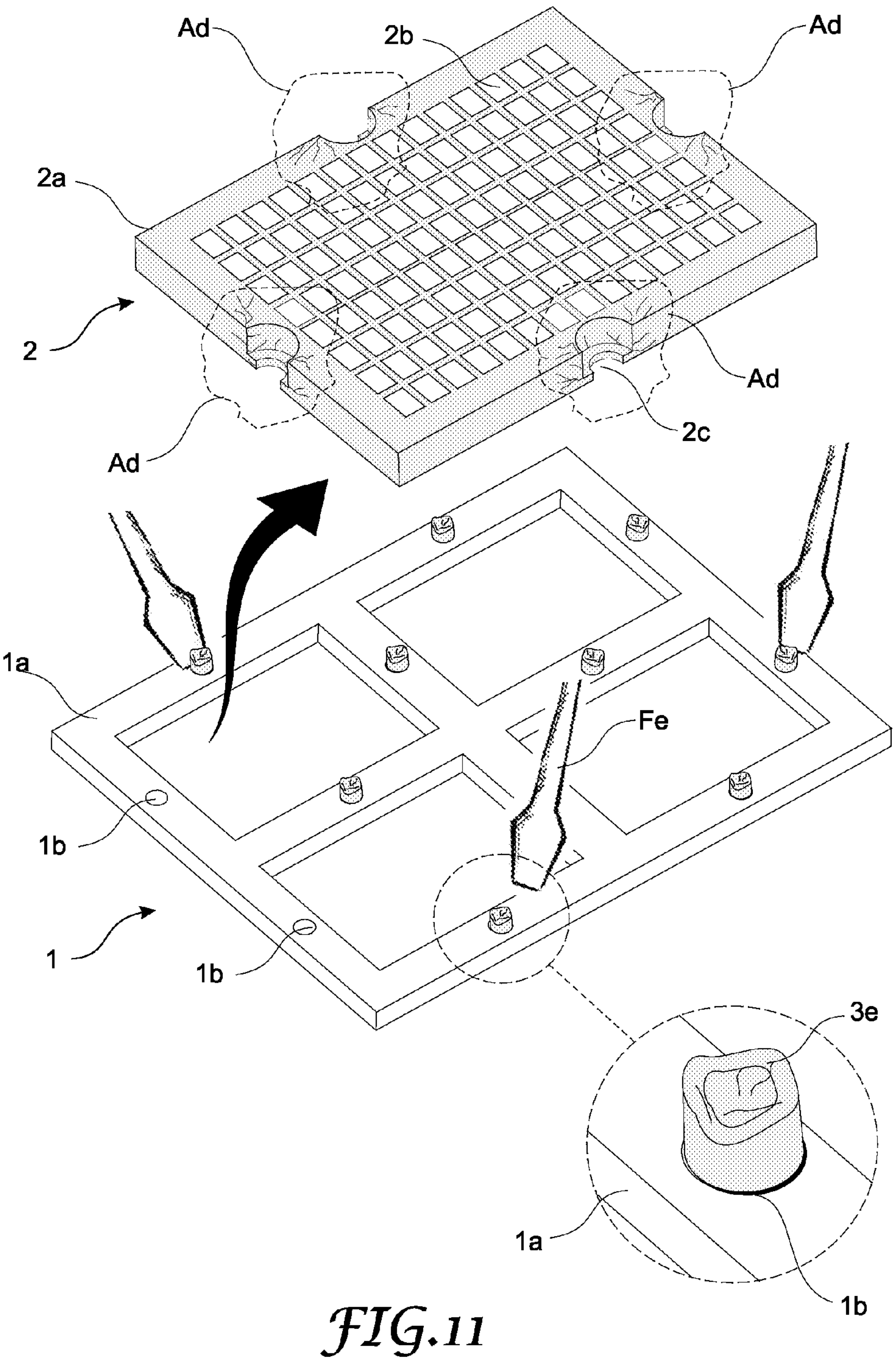
FIG. 11 is an exploded-view representation of a cubic and lamellar sorting screen component during a maintenance procedure, evidencing the damage to the structure of the modular meshes as well as retained parts of the bushing the chassis base of the screen component, showing a need for a longer time removing all residues so that the modular mesh(es) under maintenance can be replaced.

For that purpose, the removal of the remaining protrusion (3e), as seen in FIG. 11, and rigid the semicircular expansion flaps (3b) is done by using tools (Fe) like trowels, which imposes a great extraction force, leading to a condition of absent ergonomics and consequential physical stress of the worker, also requiring a long time to remove the modular meshes.

c. Cause of the Problems Found

In a remissive manner, the problems associated with poor ergonomics in the activity of both assembling and dismantling the conventional modular meshes (2) of the screen component are caused by its conventional fastening system (Fx), which is complex and causes the modular meshes (1) to, over their service life time, also experience degradation of their structure, notably the bushing (3).

Proposal of the Invention a. Objective

The first objective of this invention patent is to make the list of needs indicated above able to be fulfilled, providing an ergonomic operation for the workers who perform the activities of assembly and dismantlement of the various modular meshes, so as to confer excellence to the corresponding activities with a consequential reduction in the required time for assembly and replacement during maintenance (predictive and/or corrective, if applicable) of the vibrating screening component itself.

The second objective of this patent is to allow, for fastening the modular meshes to the chassis base of the screen component, conventional bolts (pins) to be used with various types of head specifications, especially including Allen-type heads.

The third objective of this patent is to allow the fastening and/or removal of the fastening bolts to be carried out using a conventional screwdriver tool.

b. Distinctive Characteristic

In order to make the objective of this invention achievable, an enhancement has been designed for a system for fastening the modular meshes to the chassis base, which encompasses a simplification without however renouncing its mandatory efficacy.

For that purpose, an enhancement has been designed that, in an all-new manner, integrates the modular mesh and the fastening bushing component in a single part.

With that enhancement, a simplified procedure is attained for assembling, fastening, and dismantling the modular meshes at the chassis base of the cubic and lamellar sorting screen component.

DETAILED DESCRIPTION

The following detailed description must be read and construed in reference to the drawings furnished and accounts for a preferred manner of construction of the enhanced modular mesh (20), the system for fastening that enhanced modular mesh (20) to the chassis base (1) of a cubic and lamellar sorting screen component, and also the procedures for assembly and dismantlement of those enhanced meshes s (20), without any intention to limit the scope of the invention, which is rather limited only to what is provided in the list of claims.

a. Technological Grounds

With regard to the basic design, it is kept for the cubic and lamellar sorting screen component (Et), such as illustrated in FIG. 2, that is, it is formed by a chassis base part (1) that supports the assembly and joint fastening of a matrix of modular meshes, with the enhancements applied to the modular mesh parts (20) and the system for joint fastening between enhanced modular meshes (20), positioned in a manner adjacent to each other, described in detail as follows.

b. Enhanced Modular Mesh (20)

Figure 12:
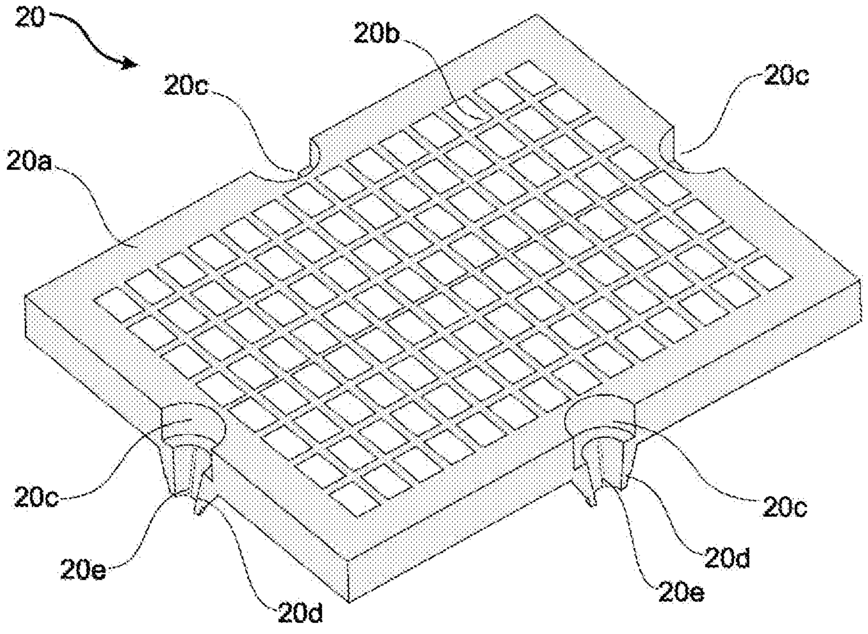
FIG. 12 is an illustrative representation of an enhanced modular mesh that integrates the enhanced cubic and lamellar sorting screen component, which is the subject of the claim in this paper.
Figure 13A:
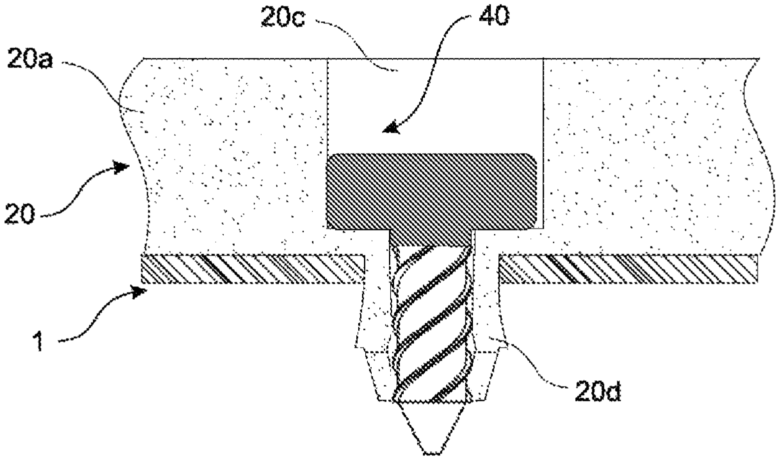
FIG. 13*a* is an illustrative representation in an orthogonal view "XX" of FIG. 2, evidencing the enhanced fastening system used in the joint mount between two modular meshes that integrate the enhanced cubic and lamellar sorting screen component.
Figure 13B:
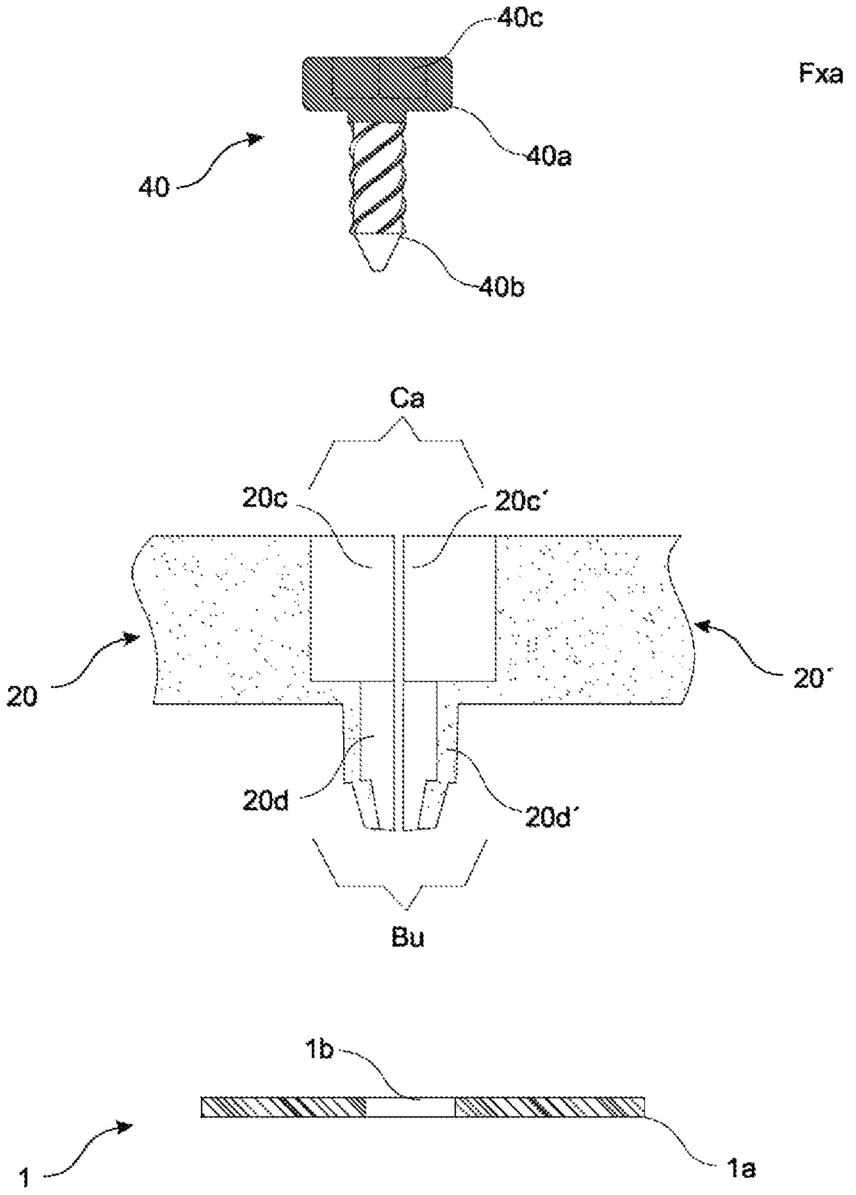
FIG. 13*b* is an illustrative representation in an exploded view of FIG. 12*a*, evidencing the parts of the enhanced fastening system used in the joint mount between two modular meshes that integrate the enhanced cubic and lamellar sorting screen component.

The enhanced modular mesh (20) is revealed in a preferred manner of construction in FIGS. 12, 13a, and 13b made of a polymeric material, notably an elastomer, which provides it with some degree of flexibility, comprising a body (20a), preferably of rectangular shape, the planar base of which is provided with a matrix of hollow elements (20b), in which, at the median portion of the sides of the same body (20a), domes are provided (20c), and adjacent to the side edges of each dome (20c) is a protrusion in the form of semicircular expansion flaps (20d), these being provided with a gap (20e) in a transverse position, thus providing a region to receive a half part of the fastening pin (4) that integrates the enhanced fastening means (Fxa).

c. Enhanced Fastening Means (Fxa)

Figure 13C:
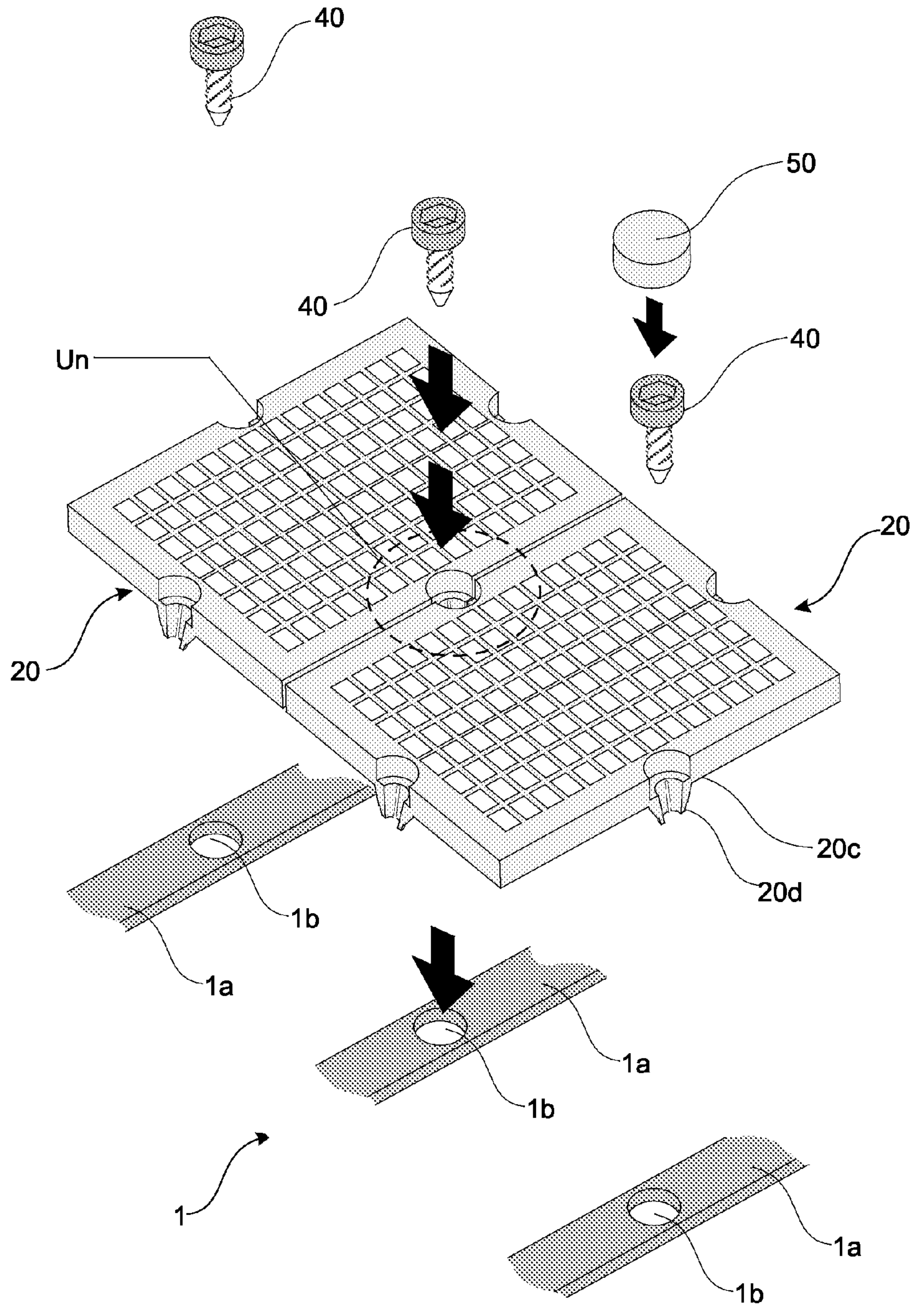
FIG. 13*c* is an exploded-view representation of a segment of the enhanced cubic and lamellar sorting screen, evidencing the enhanced modular mesh and the enhanced fastening system for two enhanced modular meshes adjacent to the chassis base of the screen.

It is the fastening means that allows the enhanced modular meshes (20) positioned adjacently to each other (Un) to be fastened to the fastening openings (1b) provided in the body (1a) of the chassis base (1) of the cubic and lamellar sorting screen component (Per), as seen in FIG. 13c, with such enhanced fastening means (Fxa) being illustrated in FIGS. 13a and 13b and made up of only three component parts, described as follows:

main dome (Ca) formed from the joining between dome (20*c*) and dome (20*c*') provided in two enhanced modular meshes (20), and (20'), respectively positioned adjacently to each other, as seen in FIG. 13*b;* fastening rod (Bu) formed from the joining between semicircular expansion flaps (20*d*) and (20*d*') provided in two enhanced modular meshes (20), and (20'), respectively positioned adjacently to each other, as seen in FIG. 13*b;* fastening pin (40): specified as being a bolt with a threaded body (40*a*) and an Allen head (40*b*), a widely commercially available bolt, that is, not a special bolt that therefore adds to the enhanced fastening means (Fxa) a reduced cost, as seen in FIG. 13*b*.

c. Procedure for Fastening Between Enhanced Modular Meshes

Figure 14A:
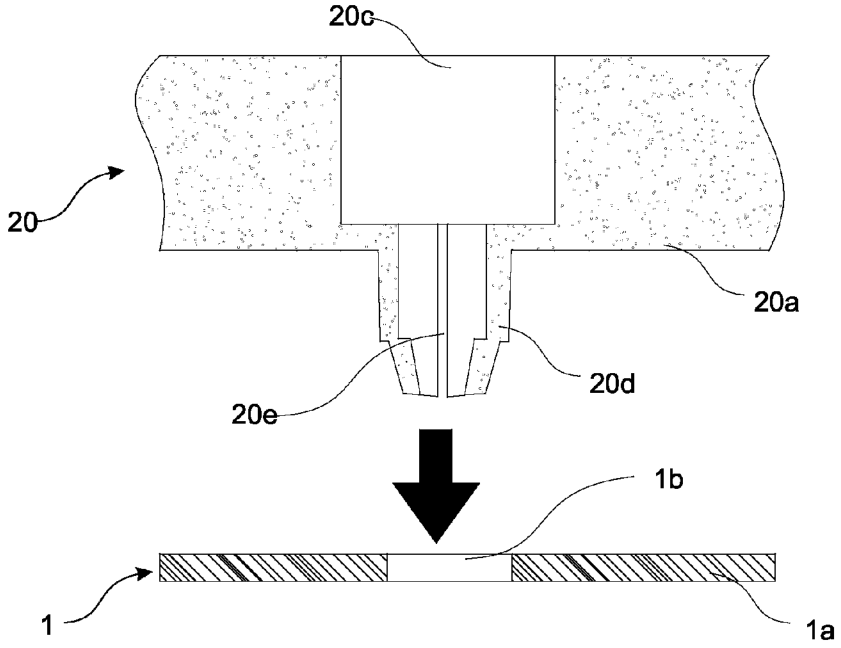
FIGS. 14*a* and 14*b* are illustrative representations in an orthogonal view "XX" of FIG. 2, evidencing the first step of application of the enhanced fastening system used in the joint mount between two modular meshes that integrate the enhanced cubic and lamellar sorting screen component.
Figure 14B:
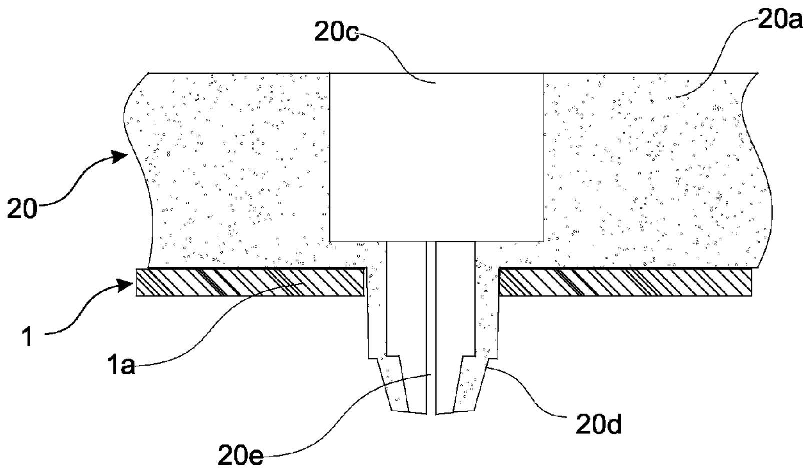
Figure 15A:
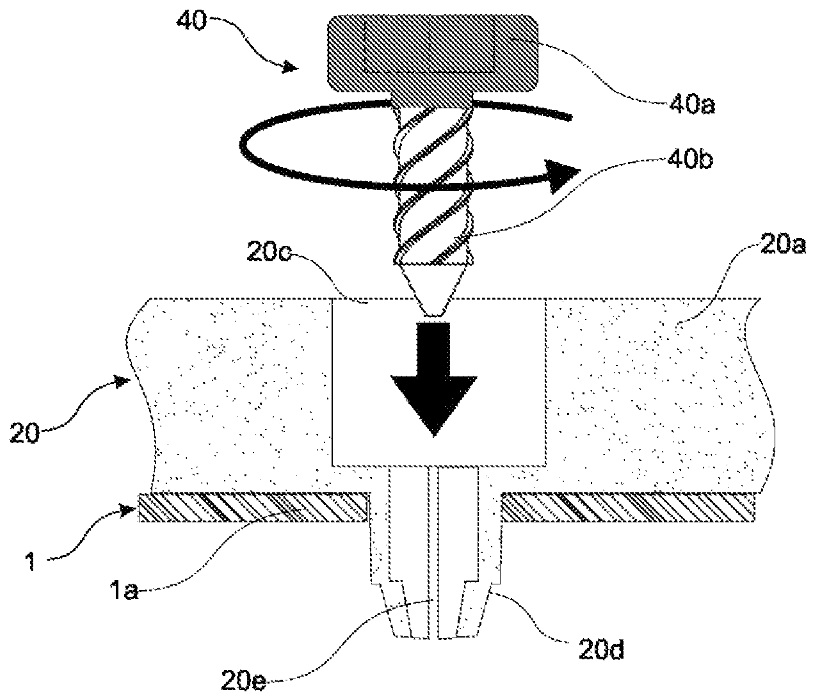
FIGS. 15*a* and 15*b* are illustrative representations in an orthogonal view "XX" of FIG. 2, evidencing the second step of application of the enhanced fastening system used in the joint mount between two modular meshes that integrate the enhanced cubic and lamellar sorting screen component.
Figure 15B:
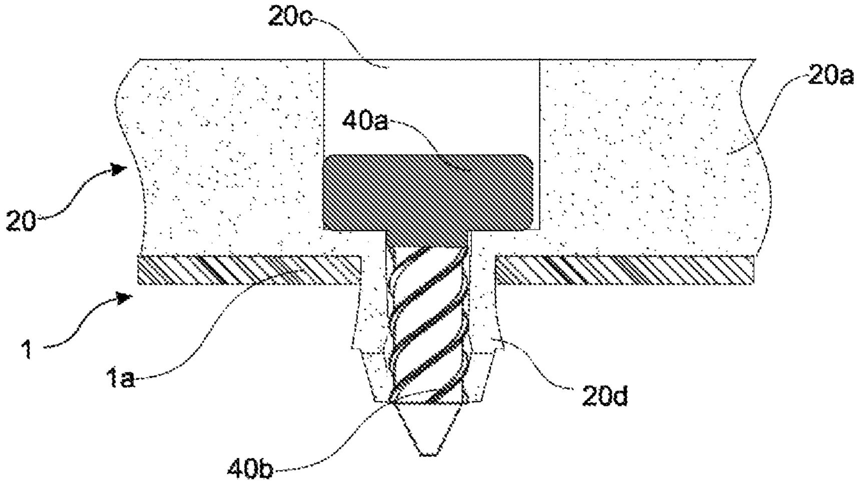

This procedure is conducted using the enhanced fastening means (Fxa), as seen in FIG. 13*b*, and the following steps are defined:

Step 1, as seen in FIGS. 14*a* and 14*b*, whereby the worker, holding two enhanced modular meshes (20), laid out adjacently to each other, as seen in FIG. 13*c*, positions the fastening rod (Bu) over the fastening opening (1*b*) of the chassis base (1), the latter passing through up to the limit in which the bodies (20*a*) of the meshes (20) rest over the body (1*a*) of the chassis base (1);

Step 2, as seen in FIGS. 15*a* and 15*b*, whereby the worker, holding the fastening pin (40), by using a conventional screwdriver tool (not shown), proceeds to position it inside the main dome (Ca), formed from the joining of two adjoining domes (20*c*) and begins to screw it inside the fastening rod (Bu), up to the limit of its thread course, proceeding to expand the semicircular expansion flaps (20*d*) and (20*d*') of the enhanced modular meshes (20) and (20') respectively, thus consolidating the locking and stability of the latter in the chassis base (1).

d. Enhanced Screen Maintenance Procedure

Figure 16A:
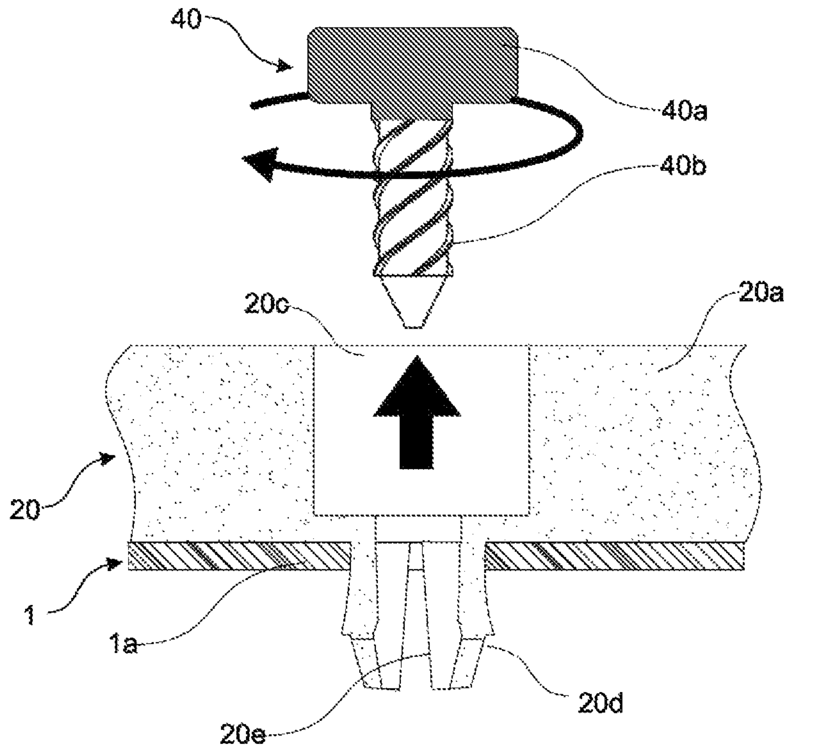
FIGS. 16*a* and 16*b* are illustrative representations in an orthogonal view "XX" of FIG. 2, evidencing the first step of removal of the modular meshes that integrate the enhanced cubic and lamellar sorting screen component, with a removal of the component pin part with Allen heads (or as otherwise specified) of the enhanced fastening system, upon a predictive or corrective maintenance action, demonstrating the ergonomics built in that activity.
Figure 16B:
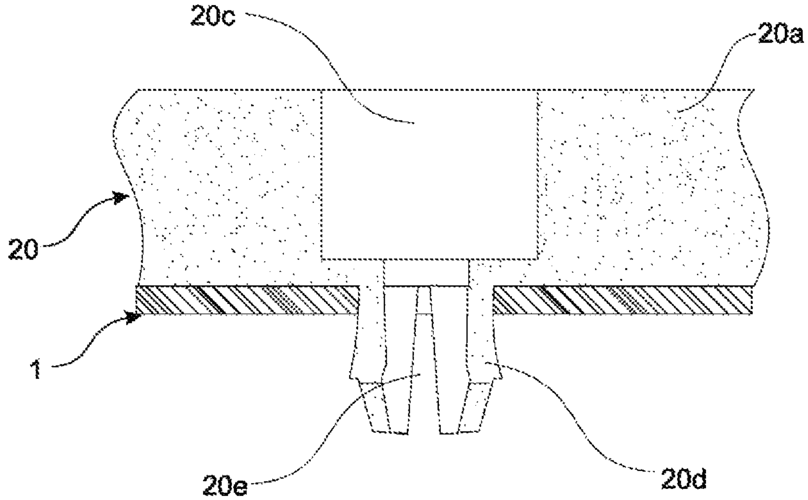
Figure 17A:
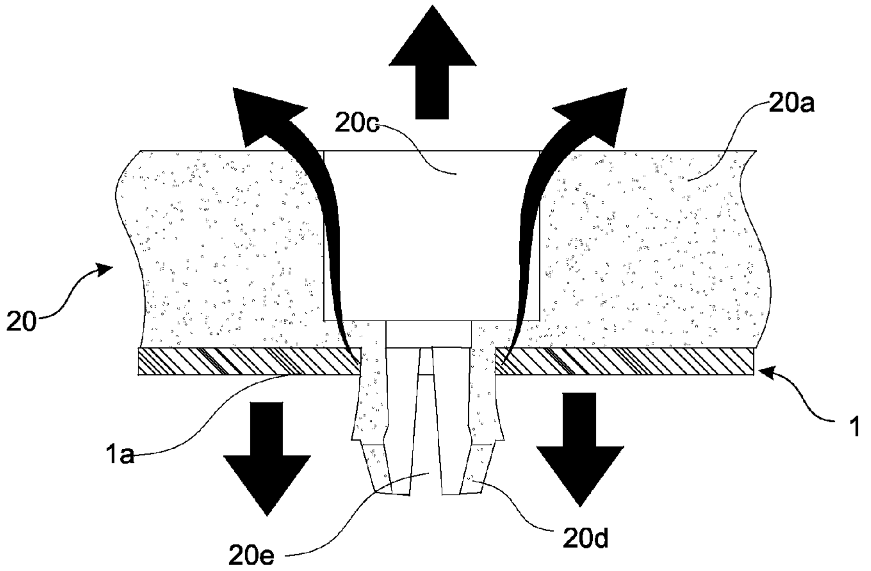
FIGS. 17*a* and 17*b* are illustrative representations in an orthogonal view "XX" of FIG. 2, evidencing the second step of removal of the enhanced modular meshes that integrate the enhanced cubic and lamellar sorting screen component, with a removal of the enhanced modular mesh component, upon a predictive or corrective maintenance action, with a separation of the chassis base from the enhanced modular mesh component, demonstrating the ergonomics built in that activity.
Figure 17B:
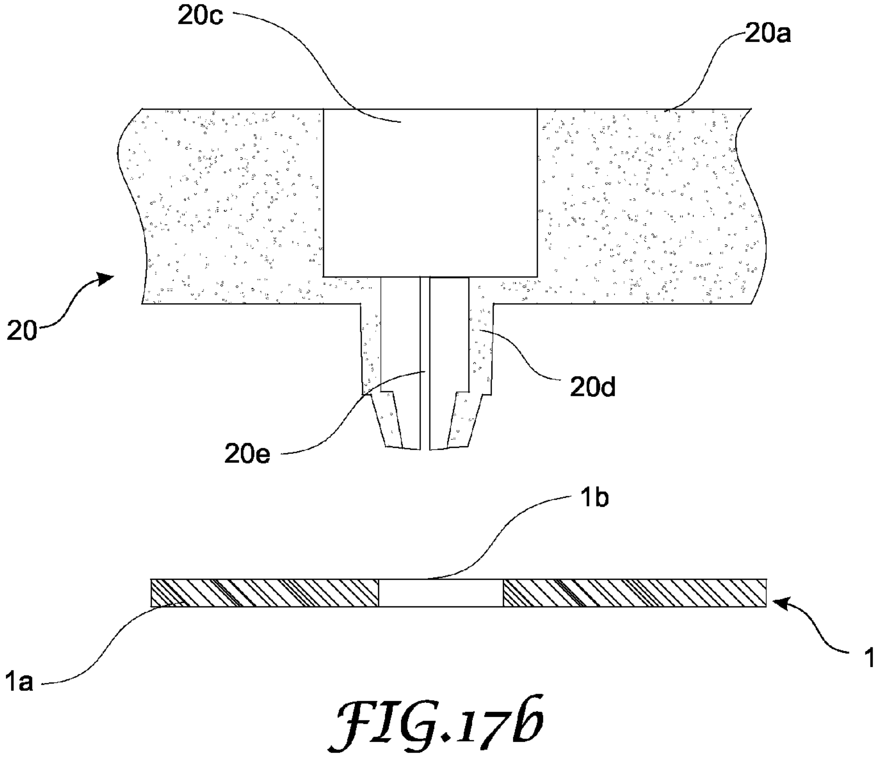
Figure 18:
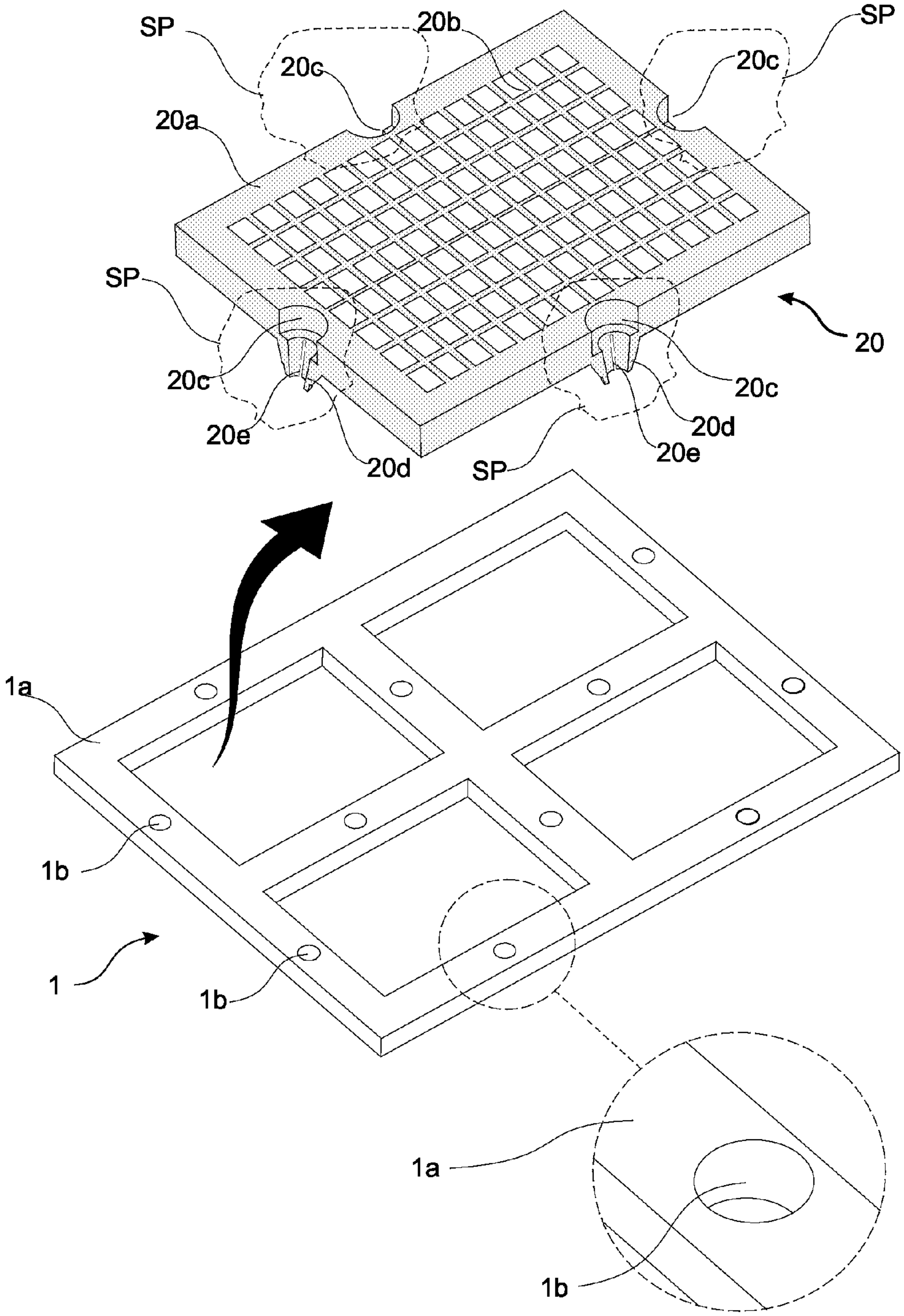
FIG. 18 is an exploded-view representation of a cubic and lamellar sorting screen component, following the procedure of removing the enhanced modular meshes, showing the chassis structure free of any residual material and ready to receive new modular meshes, evidencing a reduced time demand for that activity, as well as the absence of damage in the enhanced modular meshes removed, which can thus be reused after technical requisites are met and they are cleaned.

This is the procedure carried out to remove the enhanced modular meshes (20) for cleaning, repair, or replacement, according to the following steps:

Step 1, as seen in FIGS. 16*a* and 16*b*, whereby the worker, holding a conventional screwdriver tool (not shown), proceeds to remove the fastening pin (40), as seen in FIG. 16*a*, with the fastening rod (Bu) formed by the semicircular expansion flaps (20*d*) and (20*d*') of the enhanced modular meshes (20) and (20') respectively remaining expanded (as a result of the time spent in such a condition during the service life cycle of the meshes), Step. 2, as seen in FIGS. 17*a* and 17*b*, whereby the worker proceeds to remove the enhanced modular meshes (20) from their contact with the chassis base (1), in which it can be verified that the semicircular expansion flaps (20*d*) and (20*d*') are easily removed from the enhanced modular meshes (20) and (20') respectively, even when expanded.

e. Technical Effect Attained e.1 from the Standpoint of the Enhanced Fastening Means it is a simple system comprised of two component parts, with the fastening pin (40) being commercially produced, such as Allen-head or similar bolts, which allows for the use of a conventional screwdriver tool.

b.2 from the Standpoint of the Modular Mesh Assembly the fact that the elements forming the fastening rod (Bu), the semicircular expansion flaps (20*d*) and (20*d*'), are an integral part of the enhanced modular meshes (20) and (20') makes it easier to assemble them through the corresponding fastening opening (1*b*) of the chassis base (1) of the enhanced screen component (Per), which is easily attained and mitigates the worker's fatigue and reduces the time consolidating their assembly;

b.3 From the Standpoint of the Modular Mesh Dismantlement easy removal of the fastening pin (40) along with the fastening bush (Bu) through unscrewing done with a conventional screwdriver;

Removal of the semicircular expansion flaps (20*d*) and (20*d*') from the inside of the fastening opening (1*b*) is made extremely easier, even if expanded, since the fact that they are integral to the bodies (20*a*) of the corresponding enhanced modular meshes (20) and (20') causes these to serve as support for their removal, as seen in FIGS. 17*a* and 17*b;* as a consequence, the likelihood that the semicircular expansion flaps (20*d*) and (20*d*') will break or stay inside the fastening opening (1*b*) is mitigated, which makes the work of preparing the chassis base (1) more effective and quicker, as seen in FIG. 18; and due to how easy the enhanced modular meshes (20) and (20') can be removed, minimal damage to their structure can also be verified, as seen in FIG. 18, notably in the region (SP) of the domes (20*c*), which, if any, is a result of the condition to which they were subject during their service life cycle preceding their replacement.

The choice of the preferred manner of construction of the inventions that are part of this invention patent claimed in this paper, as described in this detail topic, is provided only for example purposes. Any changes, modifications, and variations may be effected for any other manners of construction, which can be designed by those skilled in the art without however diverting from the objectives revealed in this patent, as well as from the inventive concept applicable to them, which is exclusively defined by the attached claims.

In this manner, in a supplementary manner of construction of the enhanced fastening system, the fastening pin (40) can have its head (40*b*) covered by a protective cover (50), as seen in FIG. 13*c*, thus avoiding damage to the pin (40)+ fastening rod (Bu) system with micro particles from the ore that is poured over the screen (Per).

Figure 19:
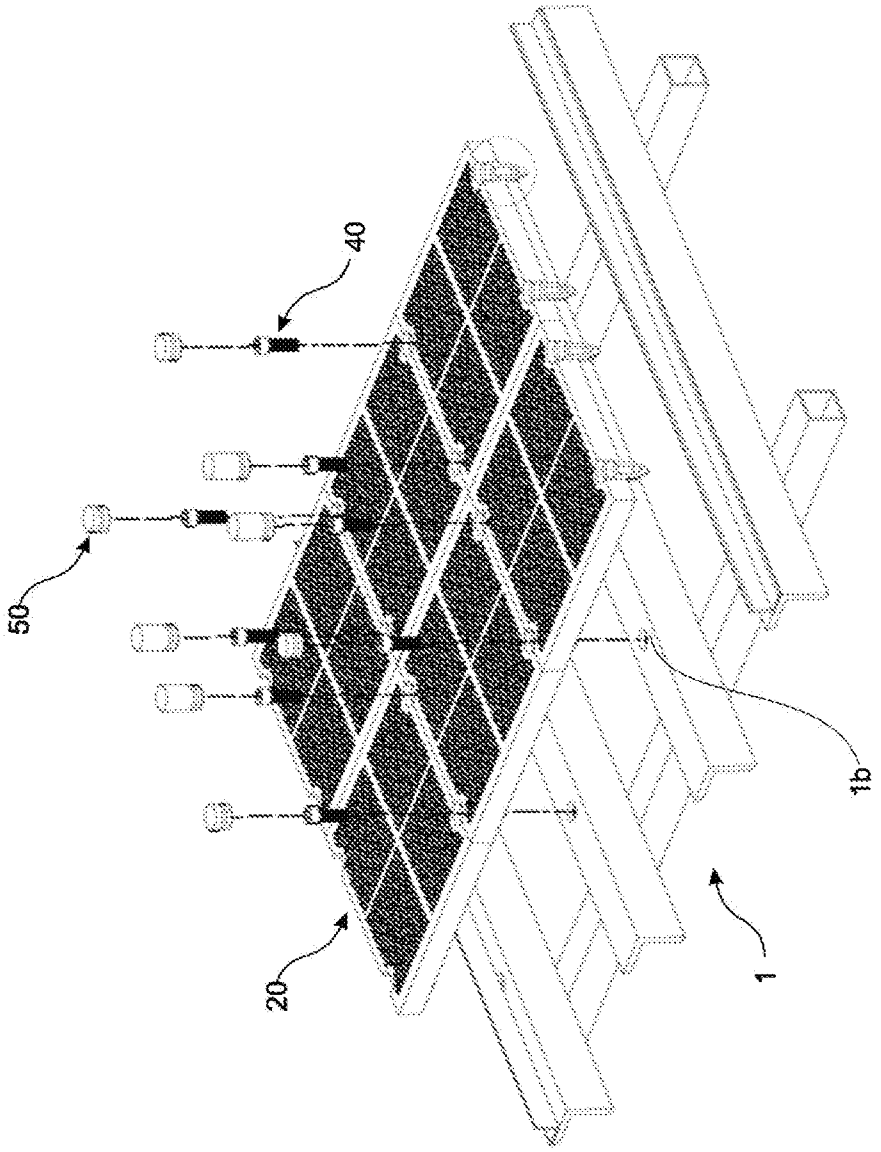
FIG. 19 is an exploded-view representation of a cubic and lamellar sorting screen component, showing a second, alternative manner for the enhanced modular mesh with protective covers for the enhanced fastening means.
Figure 20:
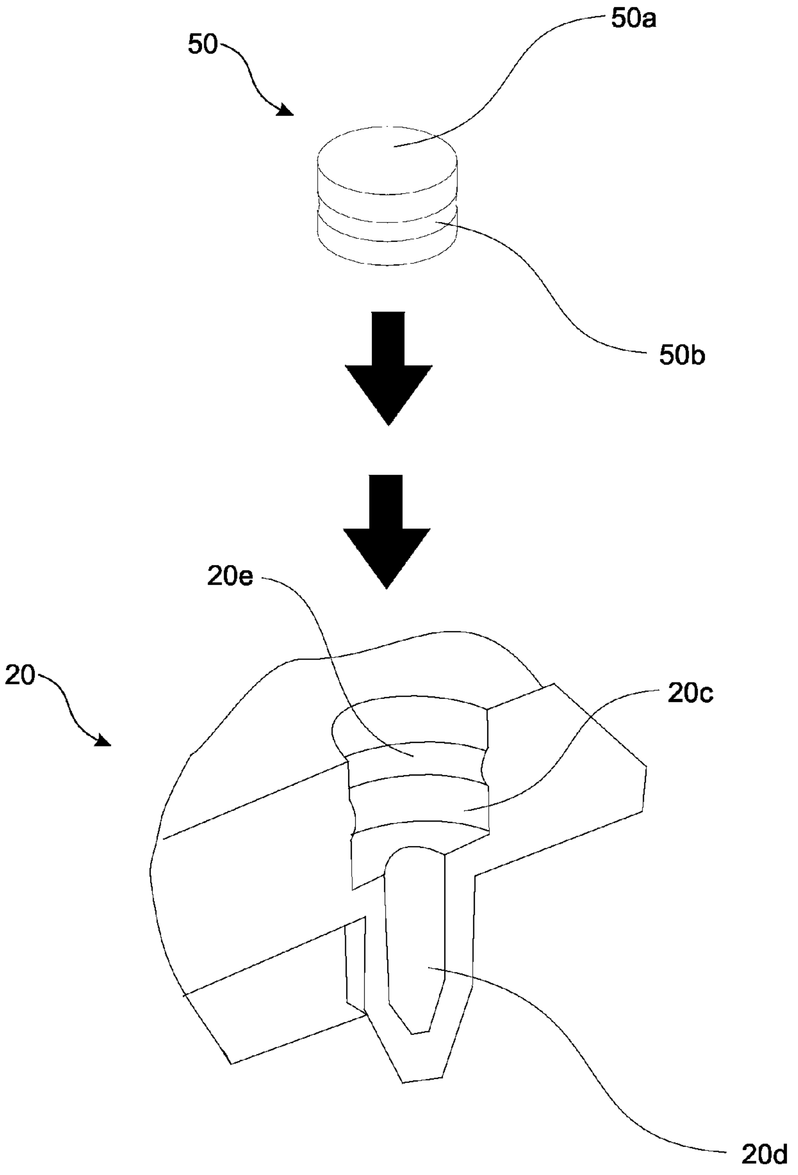
FIG. 20 is an exploded-view representation of the protective cover, showing the locking canal all over the surrounding applied with a pressure to the locking protrusion provided in the domes on the sides of the modular meshes.

Also in this alternative manner of construction, the enhanced modular mesh (20) exhibits its orthogonal length (20*d*) in the shape of a semicircular flap with a conical edge, as seen in FIG. 19, and its dome (20*c*) has a defined protrusion (20*e*) to which the canal (50*b*) provided in the body (50*a*) of the cover (50) fits and locks, as seen in FIG. 20.

Also applicable to the enhanced modular mesh (20), the latter can have a pair of domes (20*c*) provided with an extension (20*d*) on the edges of only two sides in parallel to the body (20*a*), as seen in FIG. 19.

Finally, the fastening pin (40) can be alternatively specified with its body threaded (40*b*) such as a pin or a bolt, for any type of thread.

It can thus be seen, from the above descriptions and illustrations, that the "ENHANCED MODULAR MESHES AS PART OF A VIBRATING SCREEN COMPONENT THAT INTEGRATES CUBIC AND LAMELLAR SORTING EQUIPMENT FOR SORTING MINING MATERIALS, A SYSTEM FOR JOINT FASTENING OF ADJOINING UNITS OF ENHANCED MODULAR MESHES TO THE STRUCTURAL BASE OF A VIBRATING SCREEN COMPONENT, AND A PROCEDURE FOR ASSEMBLING/DISMANTLING THAT BASE", as now claimed, comply with the rules governing this invention patent under the Industrial Property Act and are worthy, in view of what has been explained and as a consequence of it, of the corresponding privilege.

The invention claimed is:

1. A sorting screen component, comprising:

enhanced modular meshes assembled and fastened in a matrix-like manner over a chassis base of a cubic and lamellar sorting screen, said meshes being made of a polymeric material, the enhanced modular meshes comprising:

a body having a planar base which is provided with a matrix of hollow elements, in which, at a portion of sides of the body, a dome is provided, wherein an orthogonal extension develops from the first dome in the form of a semicircular expansion flap, and wherein a joint fastening system is applied to the enhanced modular meshes, positioned adjacently to each other, wherein of the joint fastening system comprises:

a main dome formed from a joining between the domes provided in two enhanced modular meshes of the enhanced modular meshes, positioned adjacently to each other, the main dome having a protrusion;

a fastening rod formed from a joining between semicircular expansion flaps provided in the two enhanced modular meshes; and a fastening pin, the fastening pin comprising a bolt comprised of a threaded body and a head covered with a protective cover, the protective cover having a canal configured to receive the protrusion of the main dome.

2. The sorting screen component of claim 1, wherein the semicircular expansion flap is provided with a gap in a transverse position.

3. The sorting screen component of claim 1, wherein the following assembly steps are conducted for fastening between two enhanced modular meshes of the enhanced modular meshes and an enhanced fastening means:

whereby a worker, holding the two enhanced modular meshes, laid out adjacently to each other, positions the fastening rod over a fastening opening of the chassis base, the latter passing through up to the limit in which the bodies of the enhanced modular meshes rest over a body of the chassis base; and whereby the worker, holding the fastening pin, by using a conventional screwdriver tool, positions the fastening pin inside the main dome, formed from the joining of two adjoining domes and screws the fastening pin inside the fastening rod, up to the limit of its thread course, to expand the semicircular expansion flaps of the enhanced modular meshes, respectively, thus consolidating a locking and a stability of the latter in the chassis base.

4. The sorting screen component of claim 1, wherein the following dismantlement steps are conducted:

whereby the worker, holding a conventional screwdriver tool, removes the fastening pin, with the fastening rod formed by the semicircular expansion flaps of the enhanced modular meshes, respectively remaining expanded; and whereby the worker removes the enhanced modular meshes from contact with the chassis base.

5. The sorting screen component of claim 1, wherein the polymeric material is an elastomer.

6. The sorting screen component of claim 1, wherein the body has a rectangular shape.

7. A fastening system, applied to two enhanced modular meshes positioned adjacent to each other, consisting of:

a main dome formed by a union between a first dome and a second dome defined in two units of the enhanced modular meshes positioned adjacent to each other, the main dome having a protrusion;

a fastening rod formed by a union between a first semicircular expansion flange and a second semicircular expansion flange defined in the two units; and a fastening pin, comprising a screw formed by a threaded body and head, covered with a protective cover, the protective cover having a canal configured to receive the protrusion of the main dome.

8. The fastening system according to claim 7, wherein the two enhanced modular meshes are fastening by the following sequential steps:

holding, by a worker, the two enhanced modular meshes, which are arranged adjacent to each other and positioning, by the worker, the fastening rod over a fastening opening of a chassis base, which extends to a point where bodies of the two enhanced modular meshes rest on a body of the chassis base; and holding, by the working the fastening pin, and positioning, using a conventional screwdriver, the fastening pin inside the main hood, and screwing the fastening pin into the fastening rod until it reaches an end of a threaded course of the fastening pin.

* * * * *